July 1, 1930.  F. H. BECKER  1,768,734
BALL BEARING CENTER FOR MACHINES
Filed Aug. 18, 1928
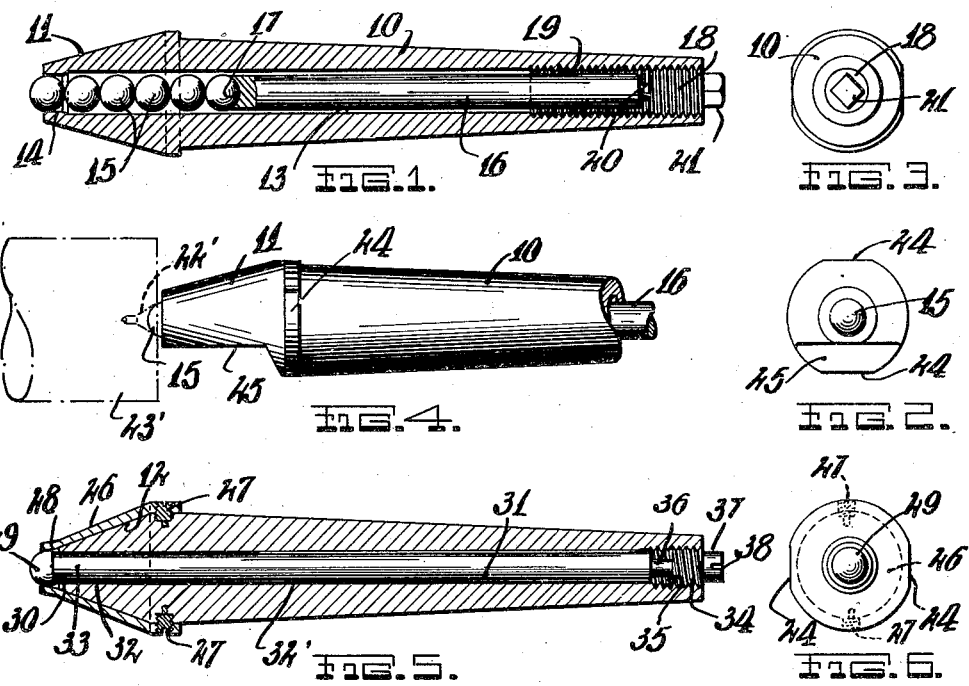
INVENTOR.
Fritz Heinz Becker
BY
ATTORNEY Patented July 1, 1930

1,768,734

UNITED STATES PATENT OFFICE

FRITZ HEINE BECKER, OF IRVINGTON, NEW JERSEY

BALL-BEARING CENTER FOR MACHINES

Application filed August 18, 1928. Serial No. 300,418.

This invention relates to a new and useful device in the nature of a machine tool center especially adapted for use in connection with machine tools such as lathes, grinders and the like for the purpose of providing a dead or tail stock center.

The object of the invention is to provide a machine tool center embodying a ready and rapid means of changing the center proper when same has become worn for the purpose of having available at all times a true center proper so as to insure the accuracy of the work or piece held or supported on my improved machine tool center.

Another object of the invention is to provide a machine tool center of comparatively simple construction cheaply manufactured and readily manipulated by the workman or artisan or average machinist.

Fig. 1 is a longitudinal central sectional view of my improved machine tool center.

Fig. 2 is a front elevational view thereof.

Fig. 3 is a rear elevational view thereof.

Fig. 4 is a fragmentary plan view thereof.

Fig. 5 is a similar sectional view to that illustrated in Fig. 1 showing another embodiment of my improved device.

Fig. 6 is a front elevational view thereof.

As here embodied my improved machine tool center comprises a tapered body element 10 adapted to frictionally engage in the usual well known manner in a suitable aperture or opening formed in the tail stock spindle of a machine tool not shown in the accompanying drawing. My improved machine tool center is provided with a somewhat enlarged head 11 bluntly pointed as at 12.

A longitudinal central opening 13 is formed in the machine tool center, which is of somewhat reduced size in diameter as at 14 in proximity of the above mentioned blunt point 14.

The above described construction is such as will permit a plurality of balls 15, preferably commercial ground ball bearings or the like to be placed or positioned in the opening 13. The opening 13 is of suitable size in diameter to freely receive the said balls 15 and the reduced portion 14 of the said opening 13 is of suitable size to frictionally engage the balls 15, as clearly shown in Fig. 1, so as to permit the said ball to project or extend somewhat beyond the blunt pointed portion of the machine tool center.

A rod 16 is adapted to freely engage in the opening 13 and is positioned or placed directly at the rear of the balls 15. Thus rod 16 is provided with a concave extremity 17 adapted to partially engage one of the balls 15. A threaded member 18, or plug threadedly engages in the threaded portion 19 of the opening 13, directly at the rear of the rod 13. This plug 18 is provided with a tip 20 of somewhat reduced cross section which engages the extremity of the rod 16. The plug 18 is also provided with an extended element 21 preferably of square cross section adapted to receive a wrench as a means of adjustably applying the said plug in the threaded portion of the opening 13.

The above described construction is such as will permit the plug 18 to be adjusted as above set forth so as to permit one of the balls 15 to extend somewhat beyond the blunt portion of the machine tool center so as to allow the said ball to partially engage in a center 22' formed in the work 23' or piece to be machined or ground. Engagement of the end balls against the work is depended upon to hold all of the balls in place.

The above described construction is also such as will permit the said ball engaged in the center of the work when worn and incapacitated to be ejected from my improved machine tool center by a further screwing in of the plug 18. The said plug and rod is then removed so as to permit the said worn ball to be replaced or repositioned in the opening 13. It being obvious that the worn ball will be worn at only one place which permits of the reuse of the said ball.

The enlarged head 11 has formed therein at the base thereof a plurality of flats 24, oppositely positioned thereon, adapted to receive a wrench or vise for the purpose of holding my improved machine tool center when the ball is advanced outwardly. The enlarged head is also cut away at one side thereof as at 25, so as to provide suitable clearance for the tool not shown in the accompanying drawing, when machining or grinding the work 23".

In Figs. 5 and 6 of the accompanying drawing I have shown a cap 26 substantially of hollow frusto-conical shape adapted to engage over the blunt pointed portion 12 of the machine tool center, and secured thereto as at 27 by threaded members preferably set screws or the like. The cap 26 has formed therein a central aperture 28, somewhat tapered inwardly adapted to engage or grip the ball 29 and other free balls already ejected so as to securely hold the said balls on the concave seat 30 formed in the center of the blunt pointed portion 12, permitting the said balls to extend somewhat beyond the cap 26 for the purpose as above set forth.

A rod 31 slidably engages in an axial longitudinal opening formed in the machine tool center and is provided with a tip 33 slidably engaging in front part 32 of the opening 32' in proximity to the balls. A threaded member 34, or plug threadedly engages in the threaded portion 35 of the opening 32', and is provided with a tip 36 adapted to engage the rod 31. This plug 34 is provided with an extended element 37 having formed therein a slot 38 adapted to receive a screw driver or the like as a means of adjusting the rod 31 so as to permit the tip 33 of the rod to support the balls in lieu of the seat 30. A rod 31 is shown positioned for the last ball 29 of the original series illustrated in Fig. 1, and the plug 34 is engaged in the innermost and final portion of the threaded portion 35.

Having thus described my invention, what I claim as new and desire to protect by Letters Patent of the United States is as follows:

1. In a machine tool center of the class described, a body element formed with a longitudinal central opening, a rod adjustably mounted in the rear portion of the opening, and balls arranged in a line in the said opening, the front ball projecting from the opening to provide a ball bearing center, the rear ball engaging against the front end of the rod, and each ball touching the balls adjacent it, and the rod being adjustable for discharging the balls one at a time for providing new ball centers when desired.

2. In a machine tool center of the class described, a body element formed with a longitudinal central opening, balls arranged in a line in said opening, the front ball projecting from the opening to provide a ball bearing center and each of the balls being in intimate contact with the adjacent balls, and means for unitarily forcing all of the balls frontwards for discharging the balls one at a time to provide new ball centers when desired.

3. In a machine tool center of the class described, a body element formed with a longitudinal central opening, balls arranged in a line in said opening, the front ball projecting from the opening to provide a ball bearing center and each of the balls being in intimate contact with the adjacent balls, and a member within the longitudinal opening and capable of being manually adjusted to various fixed positions and in intimate contact with the rear ball for discharging the balls one at a time to provide new ball centers when desired.

In testimony whereof I have affixed my signature.

FRITZ HEINE BECKER.